US010427968B2

United States Patent
Dai et al.

(10) Patent No.: US 10,427,968 B2
(45) Date of Patent: Oct. 1, 2019

(54) METHOD FOR CUTTING GLASS

(71) Applicant: MiiCs & Partners (Shenzhen) Co., Ltd., Shenzhen (CN)

(72) Inventors: Feng-Yuen Dai, New Taipei (TW); Jih-Chen Liu, New Taipei (TW); Hung-Lien Yeh, New Taipei (TW); Bing-Heng Lee, New Taipei (TW); Chung-Pei Wang, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 228 days.

(21) Appl. No.: 15/636,543

(22) Filed: Jun. 28, 2017

(65) Prior Publication Data
US 2018/0265392 A1    Sep. 20, 2018

(30) Foreign Application Priority Data

Mar. 14, 2017    (CN) .......................... 2017 1 0149874

(51) Int. Cl.
| C03B 33/08 | (2006.01) |
| C03C 17/22 | (2006.01) |
| C03C 17/32 | (2006.01) |
| C03C 23/00 | (2006.01) |
| C03B 29/02 | (2006.01) |

(52) U.S. Cl.
CPC .......... *C03B 33/082* (2013.01); *C03B 29/025* (2013.01); *C03C 17/22* (2013.01); *C03C 17/32* (2013.01); *C03C 23/0025* (2013.01); *C03C 2218/328* (2013.01); *C03C 2218/355* (2013.01)

(58) Field of Classification Search
CPC ....... C03B 33/082; C03B 33/08; C03B 32/00; C03B 29/00; C03B 29/02; C03B 29/025; C03C 23/0025
See application file for complete search history.

(56) References Cited

U.S. PATENT DOCUMENTS

| 4,338,114 | A | * | 7/1982 | Brockway | .......... | B23K 26/0736 |
| | | | | | | 65/28 |
| 4,731,254 | A | * | 3/1988 | Heineken | ................ | C03B 29/02 |
| | | | | | | 219/121.64 |
| 5,514,850 | A | * | 5/1996 | Miyazaki | ................ | B29C 59/16 |
| | | | | | | 219/121.69 |
| 5,697,998 | A | * | 12/1997 | Platus | ..................... | C03B 29/00 |
| | | | | | | 65/104 |
| 5,742,026 | A | * | 4/1998 | Dickinson, Jr. | .......... | C03B 29/00 |
| | | | | | | 219/121.69 |
| 6,143,382 | A | * | 11/2000 | Koyama | ............... | C03C 4/0071 |
| | | | | | | 216/11 |
| 6,220,058 | B1 | * | 4/2001 | Koyama | ............. | B23K 26/032 |
| | | | | | | 65/102 |
| 6,262,389 | B1 | * | 7/2001 | Koyama | ................... | C03C 4/06 |
| | | | | | | 204/192.2 |

(Continued)

*Primary Examiner* — Jason L Lazorcik
(74) *Attorney, Agent, or Firm* — ScienBiziP, P.C.

(57) ABSTRACT

A method for cutting glass is disclosed. A glass substrate is provided, the glass substrate includes at least one cutting surface, some micro-fractures are formed on the cutting surface. A conductivity material is provided and coated on the cutting surface to form a conductivity material layer. The conductivity material layer can absorb laser energy. The conductivity material layer is irradiated by laser. The glass substrate adjoined to the cutting surface is fused to repair the micro-fractures.

8 Claims, 5 Drawing Sheets

(56) References Cited

U.S. PATENT DOCUMENTS

| | | | |
|---|---|---|---|
| 6,408,649 B1 * | 6/2002 | Sklyarevich | C03B 29/025 264/432 |
| 2002/0108400 A1 * | 8/2002 | Watanabe | B23K 26/0604 65/61 |
| 2004/0154646 A1 * | 8/2004 | Hong | B29C 73/34 134/19 |
| 2006/0179722 A1 * | 8/2006 | Spindler | C03B 27/026 49/501 |
| 2008/0041833 A1 * | 2/2008 | Cavallaro | C03B 29/025 219/121.85 |
| 2008/0202167 A1 * | 8/2008 | Cavallaro | B23K 26/0736 65/104 |
| 2010/0025387 A1 * | 2/2010 | Arai | B28D 5/00 219/121.69 |
| 2011/0067448 A1 * | 3/2011 | Matsumoto | B23K 26/324 65/36 |
| 2011/0088430 A1 * | 4/2011 | Matsumoto | B23K 26/324 65/43 |
| 2012/0247153 A1 * | 10/2012 | Matsumoto | B23K 26/18 65/43 |
| 2013/0134396 A1 * | 5/2013 | Shimomura | H01L 51/5012 257/40 |
| 2014/0113528 A1 * | 4/2014 | Cormont | B24B 13/00 451/6 |
| 2015/0053657 A1 * | 2/2015 | Chadin | B23K 26/352 219/121.73 |
| 2015/0104584 A1 * | 4/2015 | Chen | C08J 7/123 427/534 |
| 2017/0050881 A1 * | 2/2017 | Abdolvand | B23K 26/32 |
| 2017/0355633 A1 * | 12/2017 | Cook | C03B 23/203 |

* cited by examiner

METHOD FOR CUTTING GLASS

FIELD

The subject matter generally relates to a method for cutting glass.

BACKGROUND

Computer numerical control (CNC) technologies are usually used to cut glass to desired shapes. However, some micro-fractures may generate at the surface of the glass after the CNC process, which results in a region of high stress concentration. Thus, the glass may fracture easily due to the micro-fractures.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
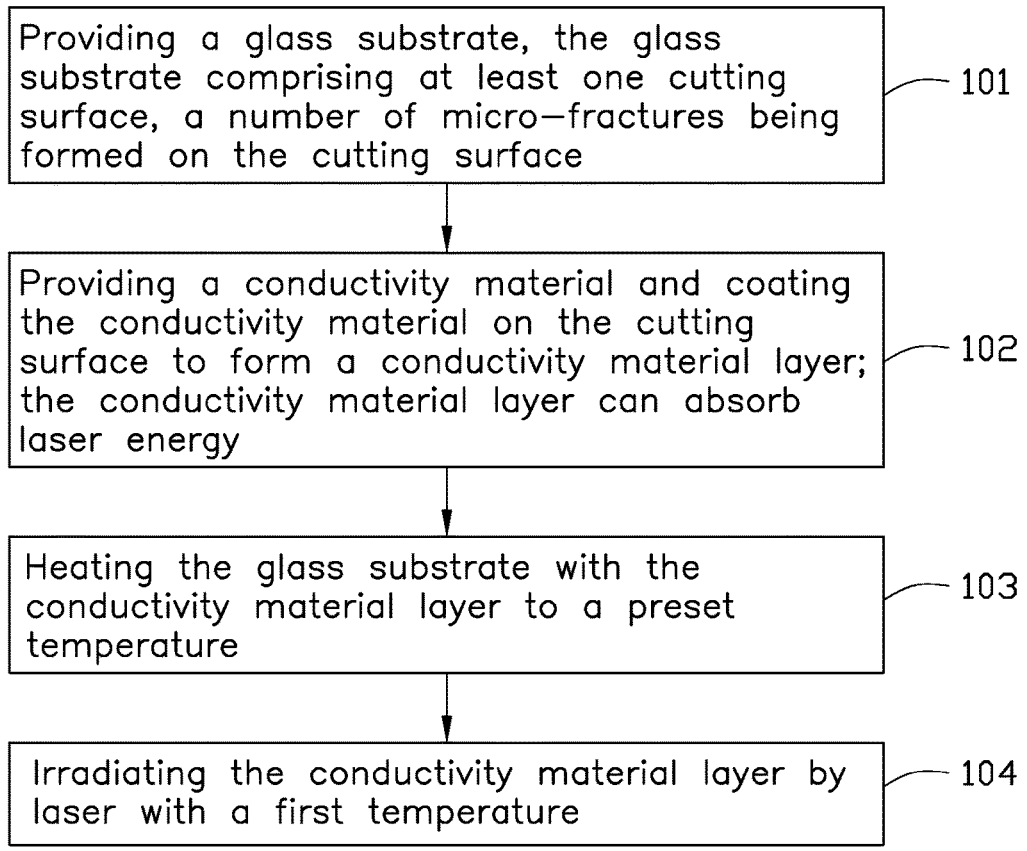
FIG. 1 is a flowchart of an exemplary embodiment of a method for cutting a glass.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

The term "comprising," when utilized, means "including, but not necessarily limited to"; it specifically indicates open-ended inclusion or membership in the so-described combination, group, series and the like.

FIG. 1 illustrates a flowchart of a method for cutting glass. The method is provided by way of example, as there are a variety of ways to carry out the method. The method described below can be carried out using the configurations illustrated in FIGS. 2-5, for example, and various elements of these figures are referenced in explaining example method. Each block shown in FIG. 1 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 101.

Figure 2:
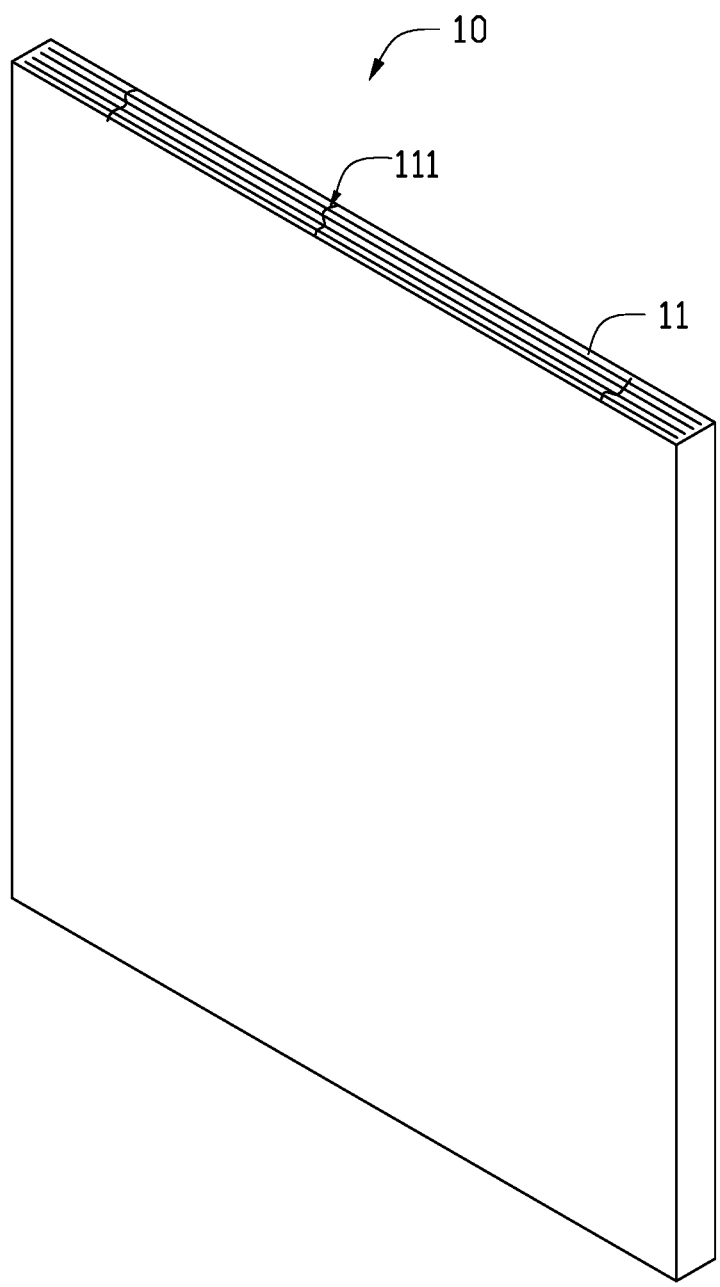
FIG. 2 is a diagrammatic view of a glass substrate used in the method of FIG. 1.

At block 101, also illustrated by FIG. 2, a glass substrate 10 is provided.

The glass substrate 10 has a certain size and a certain shape. The glass substrate 10 includes at least one surface 11 formed by cutting a glass block (hereinafter, "cutting surface"). A number of stripes and micro-fractures 111 are formed on the cutting surface 11.

The glass substrate 10 can be a two dimensional (2D) glass substrate or a three dimensional (3D) glass substrate. In at least one exemplary embodiment, the glass substrate 10 is a 3D glass substrate.

Figure 3:
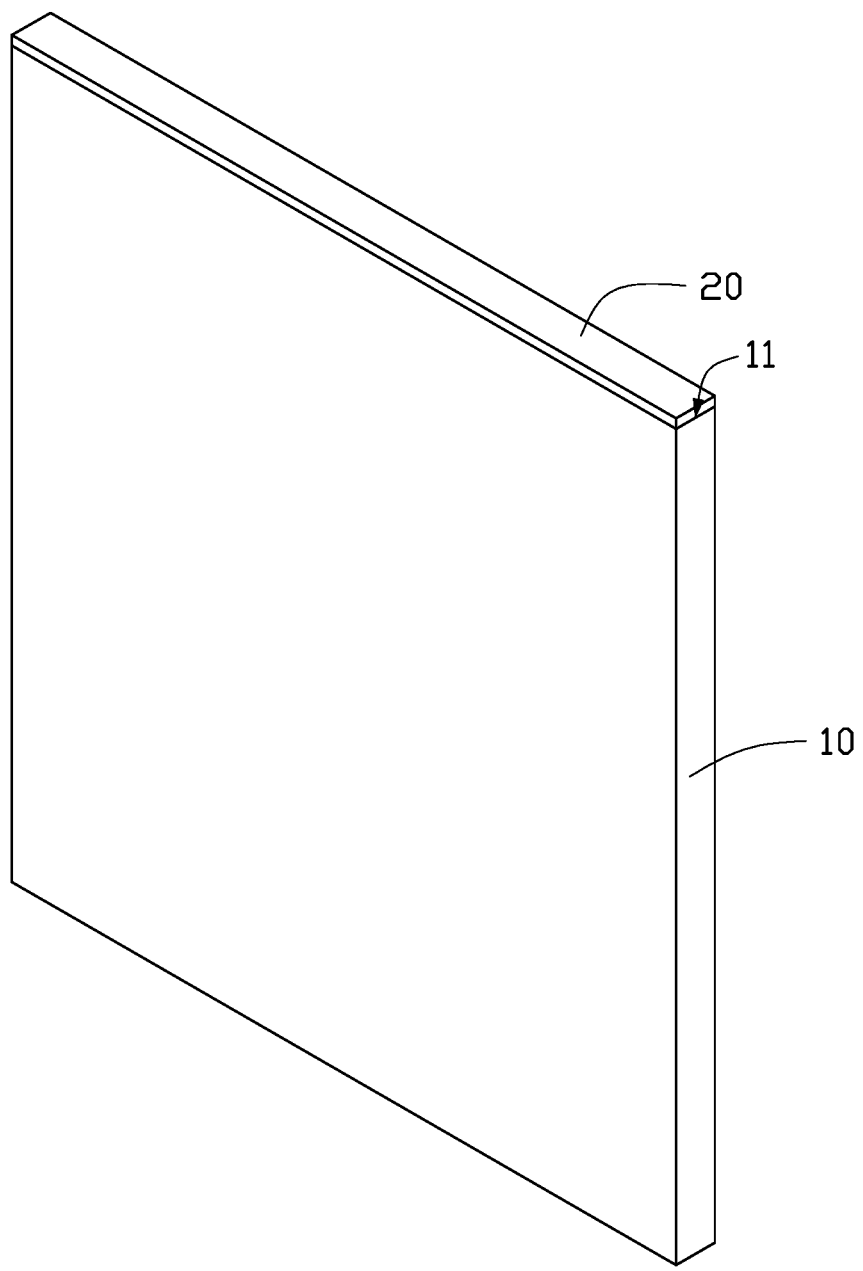
FIG. 3 is a diagrammatic view showing a conductivity material layer formed on the glass substrate of FIG. 2.

At block 102, also illustrated by FIG. 3, a conductivity material is coated on the cutting surface 11 to form a conductivity material layer 20.

The conductivity material layer 20 can absorb laser energy.

The conductivity material layer 20 can further react with oxygen in the air to form $CO_2$ when being heated. Thereby, the conductivity material layer 20 can be decomposed or entirely consumed.

The conductivity material can be a material comprising carbon.

Further, the conductivity material can be selected from colored adhesive material, colored paint, and ink.

Figure 4:
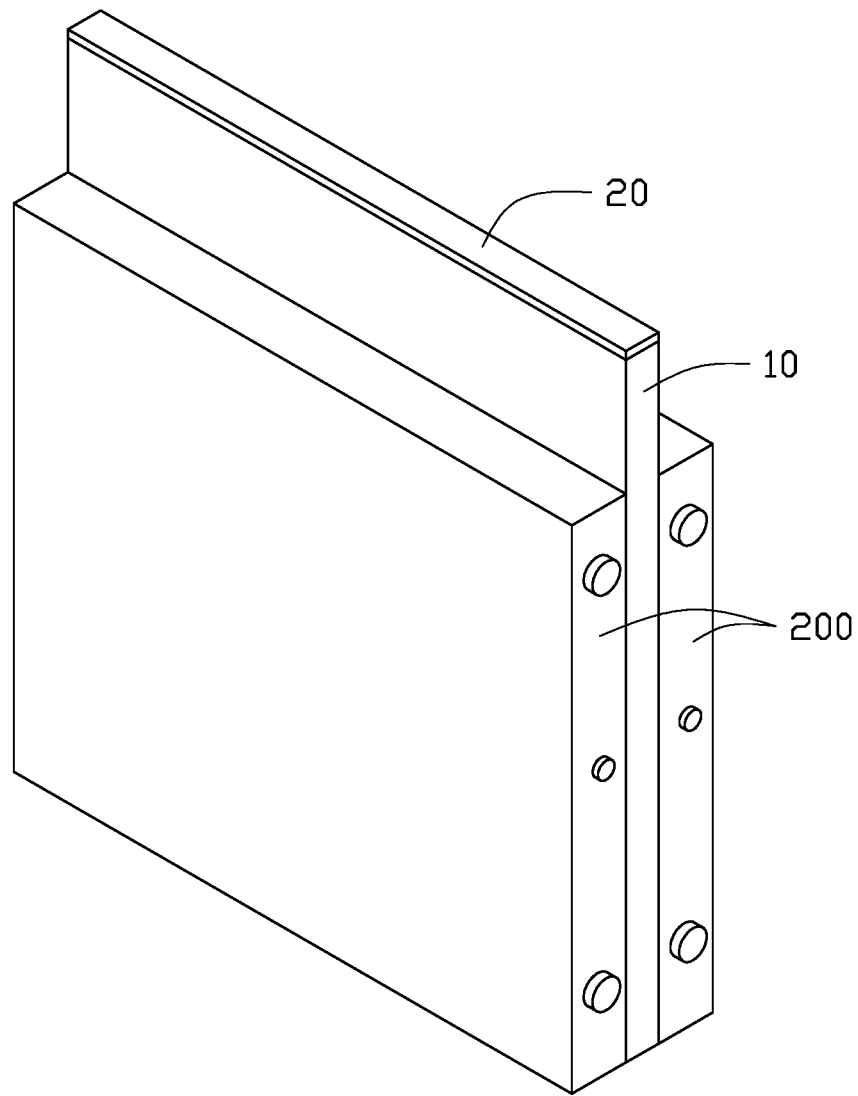
FIG. 4 is a diagrammatic view showing the glass substrate and the conductivity material layer of FIG. 3 being heated.

At block 103, also illustrated by FIG. 4, the glass substrate 10 with the conductivity material layer 20 is heated by a heating device 200 to a preset temperature, thereby preventing a temperature difference being generated between a portion of the cutting surface 11 which is irradiated by laser (further referring to block 104) and the other portion of the cutting surface 11 which is not irradiated by laser. Thus, a thermal stress in the glass substrate 10 is reduced which can prevent the glass substrate 10 from fracturing.

In one exemplary embodiment, the preset temperature is greater than 450 degrees Celsius.

Figure 5:
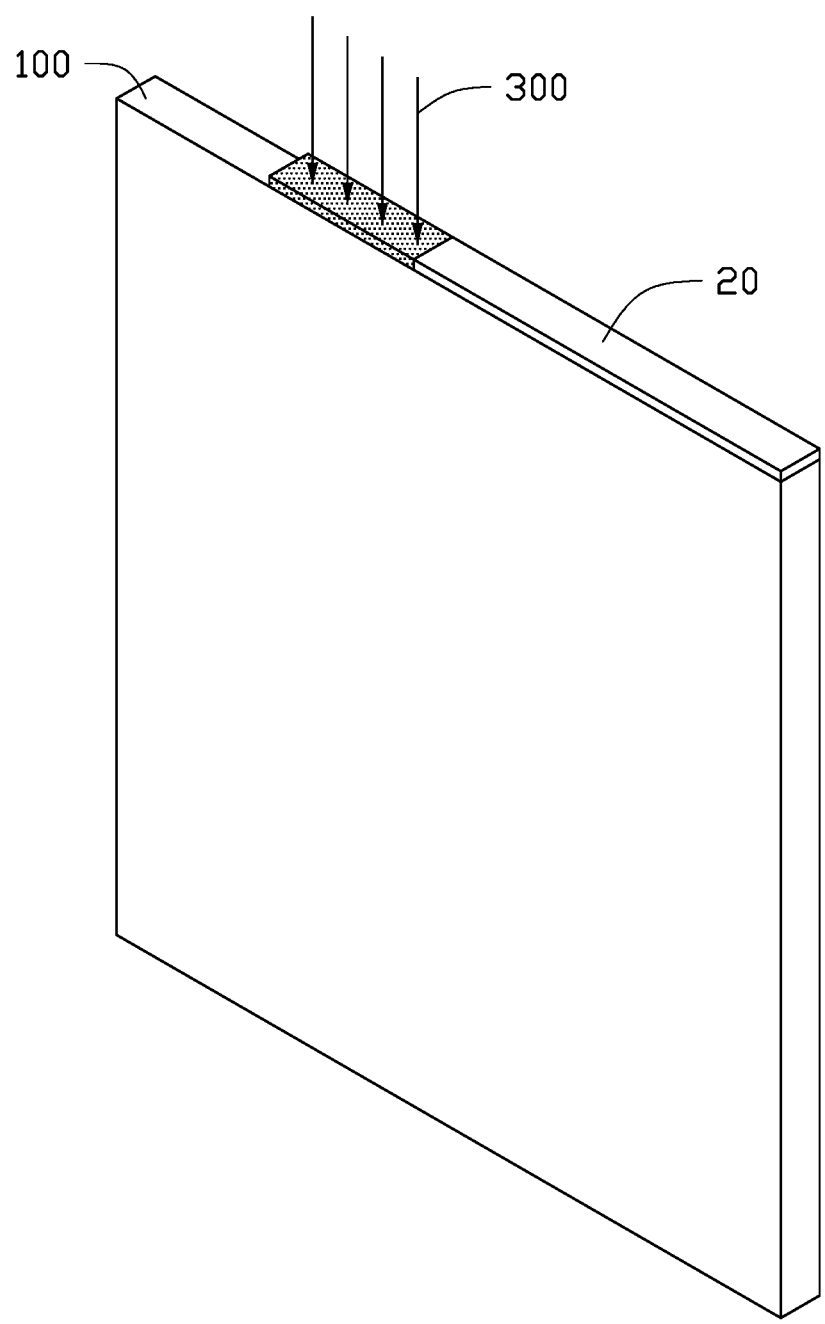
FIG. 5 is a diagrammatic view showing the conductivity material layer of FIG. 4 radiated by laser.

At block 104, also illustrated by FIG. 5, the conductivity material layer 20 is irradiated by laser with a first temperature, which absorbs laser energy and transmits the laser energy to the glass substrate 10. Thus, the laser energy melts the glass substrate 10 at the cutting surface 11 to remove the stripes and micro-fractures, thereby forming the glass 100.

A width of the laser is greater than a width of the cutting surface 11.

The conductivity material layer 20 is decomposed after the laser radiation.

Before irradiating by laser with the first temperature, the conductivity material layer 20 is radiated by layer with a second temperature lower than the first temperature to reduce the temperature difference between a portion of the cutting surface 11 which is irradiated by laser and the other portions of the cutting surface 11 which are not irradiated, thereby reducing the thermal stress in the glass substrate 10.

The first temperature is a transformation temperature of the glass 100.

After irradiating by laser with the first temperature, the glass 100 is further irradiated by laser with a third temperature lower than the first temperature for tempering, thereby releasing thermal stress in the glass 100.

With the above configuration, 1) since the conductivity material layer 20 can absorb laser energy, the conductivity material layer 20 can transmit the laser energy to the glass substrate 10 to make the glass substrate 10 at the cutting surface 11 to be melted to remove the stripes and micro-fractures at the cutting surface 11; 2) since the conductivity material layer 20 is only formed on the cutting surface 11, the glass substrate 10 can keep its original shape after the stripes and micro-fractures at the cutting surface 11 are removed; 3) since the conductivity material layer 20 can react with oxygen in the air to form $CO_2$, the conductivity material layer 20 can be directly decomposed or entirely consumed, thereby simplifying the method.

The embodiments shown and described above are only examples. Many details are often found in the art such as the other features of the lead frame and light emitting diode package having the same. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A method for cutting glass, comprising:
   providing a glass substrate, the glass substrate comprising at least one cutting surface, a plurality of micro-fractures being formed on the cutting surface;
   coating a conductivity material on the cutting surface to form a conductivity material layer, the conductivity material layer having a capability for absorbing laser energy; and
   irradiating the conductivity material layer by laser, causing the conductivity material layer to absorb the laser energy and transmit the laser energy to the glass substrate, thereby causing the laser energy to melt the glass substrate at the cutting surface to remove the plurality of micro-fractures.

2. The method of claim 1, wherein the conductivity material layer comprises carbon.

3. The method of claim 2, wherein the conductivity material layer is selected from a group consisting of colored adhesive material, colored paint, and ink.

4. The method of claim 1, before the irradiating the conductivity material layer by the laser, the method further comprising:
   heating the glass substrate with the conductivity material layer to a preset temperature.

5. The method of claim 4, wherein the preset temperature is greater than 450 degrees Celsius.

6. The method of claim 1, wherein a width of laser beam in the laser is greater than a width of the cutting surface.

7. The method of claim 1, wherein the irradiating the conductivity material layer by laser comprises:
   irradiating the conductivity material layer by the laser with a second temperature;
   irradiating the conductivity material layer by the laser with a first temperature, the second temperature being lower than the first temperature; and
   irradiating the glass substrate by the laser with a third temperature lower than the first temperature for tempering.

8. The method of claim 7, wherein the first temperature is a transformation temperature of the glass substrate.

* * * * *